Jan. 7, 1936.  C. H. CLEVELAND ET AL  2,026,821
APPARATUS FOR RENEWING WORN VALVE SEATS
Filed Sept. 30, 1931   4 Sheets-Sheet 1

INVENTORS
CHARLES H. CLEVELAND
CHARLES A. HEINE
JOHN T. ALLISON
BY
ATTORNEYS

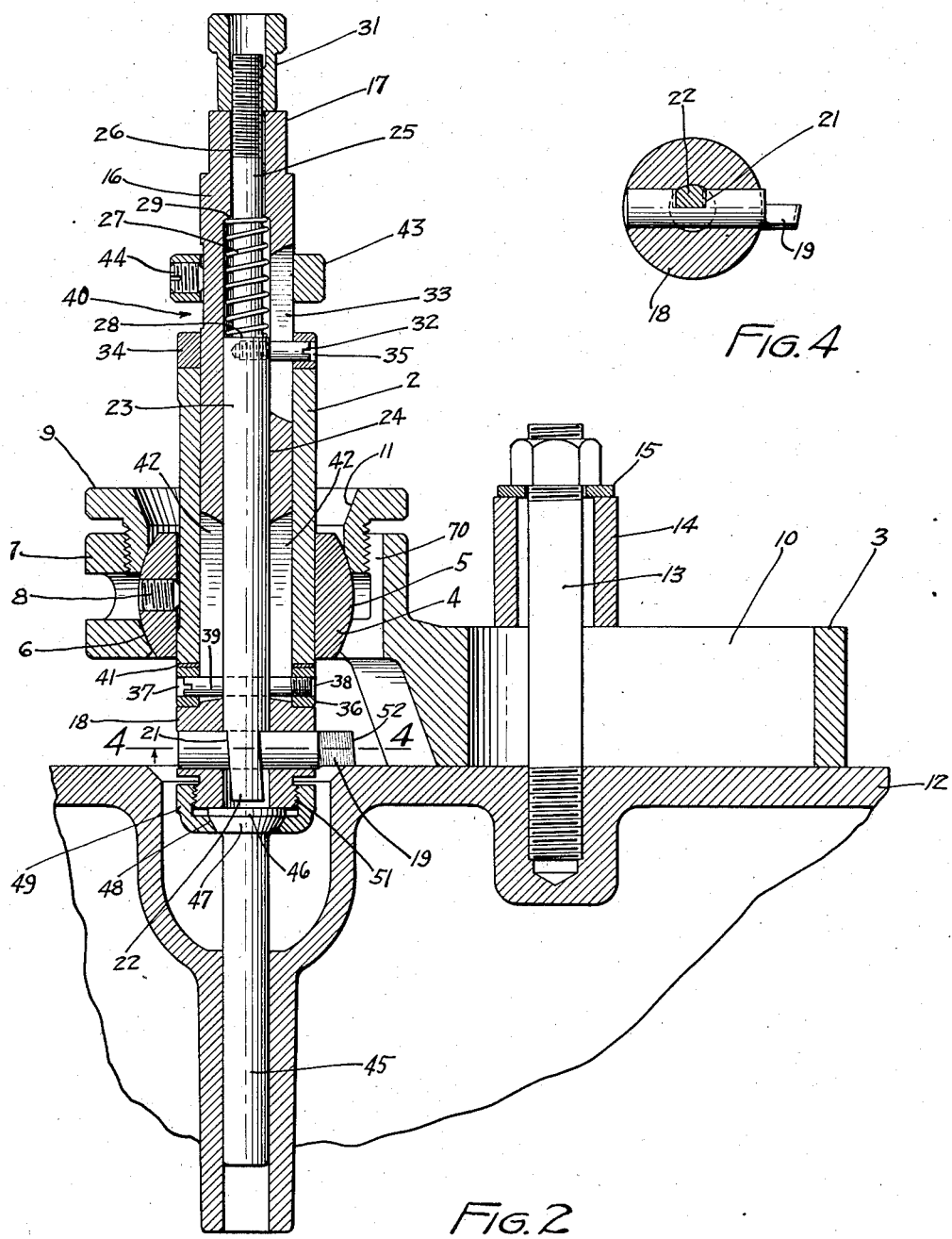

Jan. 7, 1936.  C. H. CLEVELAND ET AL  2,026,821
APPARATUS FOR RENEWING WORN VALVE SEATS
Filed Sept. 30, 1931.  4 Sheets-Sheet 3
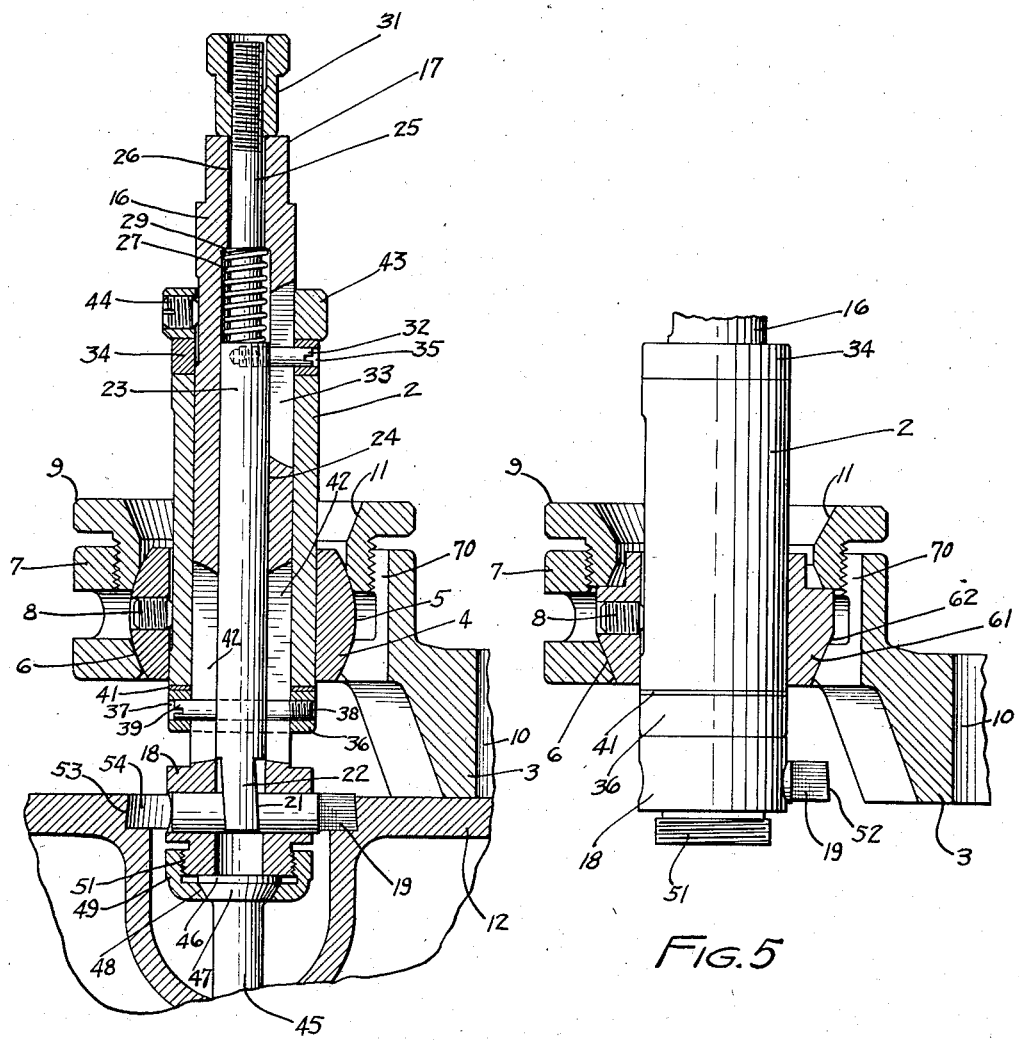
FIG.3
FIG.5
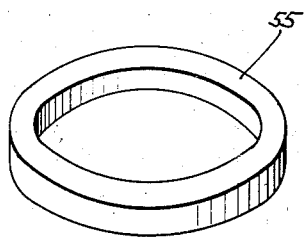
FIG.6
INVENTORS
CHARLES H. CLEVELAND
CHARLES A. HEINE
JOHN T. ALLISON
BY
ATTORNEYS Jan. 7, 1936.  C. H. CLEVELAND ET AL  2,026,821
APPARATUS FOR RENEWING WORN VALVE SEATS
Filed Sept. 30, 1931  4 Sheets-Sheet 4

INVENTORS
CHARLES H. CLEVELAND
CHARLES A. HEINE
JOHN T. ALLISON
BY Paul, Paul & Moore
ATTORNEYS Patented Jan. 7, 1936

2,026,821

UNITED STATES PATENT OFFICE 2,026,821

APPARATUS FOR RENEWING WORN VALVE SEATS

Charles H. Cleveland, Charles A. Heine, and John T. Allison, Minneapolis, Minn.

Application September 30, 1931, Serial No. 565,990

11 Claims. (Cl. 90—12.5)

This invention relates to an improved method of and apparatus for renewing worn valve seats.

Valve seats of rapidly operating valves such as are used in internal combustion engines and other structures, after considerable use and frequent re-grinding, often become worn to the extent that they can no longer be rendered useful by regrinding. To insure efficient engine operation, the valve seats should be true and reasonably clean in order to prevent valve leakage. When a valve seat becomes badly worn, it often becomes necessary to replace it by cutting away the old seat and substituting in place thereof an insert in which a new valve seat may be cut. It is to this particular operation that this invention more particularly relates.

To guard against valve leakage and to insure proper functioning of the engine, these inserts must be rigidly secured to the engine block so that they cannot accidentally work loose and thereby cause damage to the operating parts of the engine. It is now common to secure valve inserts in their recesses by such means as screw threads, or by screws or pins or by a press fit; but such methods have been found more or less unsatisfactory because of the danger of the securing means becoming ineffective and permitting the inserts to relatively move in their seats or recesses. It is therefore desirable that means be provided whereby the inserts may be permanently secured in their seats or recesses. To thus secure the inserts in their respective recesses, the outer walls of the latter are undercut whereby the bottoms of the recesses are larger in diameter than the tops thereof. Into these recesses annular inserts are fitted, and they are then expanded by suitable means until the outer walls thereof are pressed into bonding engagement with the outer tapered walls of the recesses, whereby the inserts become, in effect, an integral part of the engine block and whereby they cannot possibly become loose in the recesses.

An object of the invention is to provide an improved method of renewing worn valve seats in an engine, which consists in cutting an annular recess in the engine block to remove the worn valve seat, then inserting an annular insert in said recess, and subsequently expanding said insert until the outer wall thereof is pressed into bonding engagement with the outer wall of the recess.

A further object of the invention is to provide a tool for removing worn valve seats, comprising a spindle having a cutting element supported therein and provided with means whereby said element may be axially translated to control the outward feeding thereof, said tool also having means for supporting the spindle in axial alinement with a valve seat.

A further object is to provide a tool of the class described comprising a sleeve having a spindle mounted for rotary and longitudinal movements therein and provided at its lower end with a cutting element, and means within the spindle for axially translating said element to control the radial feeding thereof, and a bracket being provided for universally supporting said spindle, said bracket being adapted to be secured to the face of an engine block by means of the usual cylinder head bolts or studs.

A further object is to provide a tool of the class described comprising a supporting member adapted to be secured to a face of an engine block and having means for adjustably supporting a spindle therein so that the latter may be axially alined with a valve seat, and the spindle having at its lower end a detachable pilot adapted to be inserted into the valve stem guide to facilitate alining the spindle with the valve seat.

A further object is to provide a tool for cutting an annular recess in an engine block to remove a worn valve seat, and into which recess an insert is mounted and adapted to be radially expanded to secure it in fixed relation in said recess.

A further object is to provide in an engine block an annular recess having an outer tapered or undercut wall, said recess being adapted to receive an annular insert, and means being provided for expanding said insert to cause the outer wall thereof to firmly engage the tapered wall of said recess whereby the insert wil be secured therein, and the expanding action of the tool on the insert causing the material of the latter to be compressed, with the result that the material thereof is toughened and increased in strength.

Other objects reside in the construction of the bracket for supporting the spindle, including the means permitting universal adjustment of the spindle therein; in the means provided upon the tool for limiting the depth of the cut of the cutting tool; in the novel means provided for longitudinally feeding the cutting tool, which may readily be accomplished while the tool is in operation; and, in the simple and inexpensive construction of the apparatus as a whole, which is such that it may be manufactured at a low cost and may be quickly attached to an engine block in position to cut an annular recess therein adapted to receive an insert.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 2 is an enlarged cross sectional view showing the general construction of the tool and also showing the pilot stem inserted in the valve guide;

Figure 3 is a view similar to Figure 2, with some of the parts broken away, showing the cutting element positioned in the bottom of the recess;

Figure 4 is a sectional plan view on the line 4—4 of Figure 2, showing the means for supporting and retaining the cutting element in the spindle;

Figure 5 is a detail sectional view showing a supporting bracket of modified form;

Figure 6 is a perspective view showing an insert before being secured in the recess;

Figure 7:
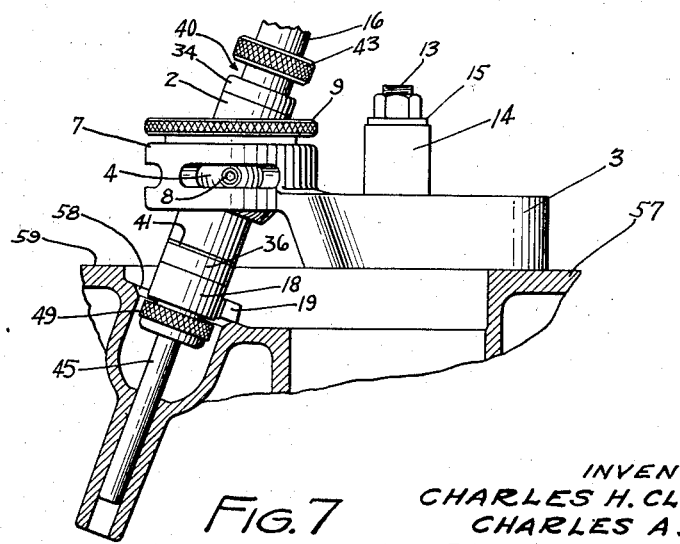
Figure 7 is a detail sectional view on a smaller scale, showing the tool supported at an angle in the supporting bracket to adapt it to a valve seat which is angularly disposed with respect to the top face of the engine block.

The novel tool herein disclosed comprises a supporting sleeve 2 adjustably mounted in a supporting bracket 3 by a member 4 having a spherical surface 5 adapted to be engaged with an annular beveled seat 6 provided in the head 7 of the supporting bracket 3. The member 4 is bored to receive the sleeve 2 and has a set screw 8 for adjustably securing the sleeve therein. The member 4 is secured to the seat 6 by means of a flanged nut 9 received in threaded engagement with the upper portion of the head 7. The aperture in the nut 9 in which the sleeve 2 is mounted, as shown in Figure 2, has its upper portion beveled as indicated at 11, to permit the sleeve to be tilted at an angle therein as shown in Figure 7.

The supporting bracket 3 is adapted to be secured to the engine block 12 by means of one of the usual cylinder head bolts or studs 13, as shown in Figure 2. The stud 13 is received in a suitable elongated aperture or slot 10 provided in the bracket 3. A suitable spacer 14 may be inserted between the upper face of the supporting bracket 3 and a suitable washer 15 provided on the stud 13 so that the bracket may be securely clamped against the face of the engine block.

Figure 1:
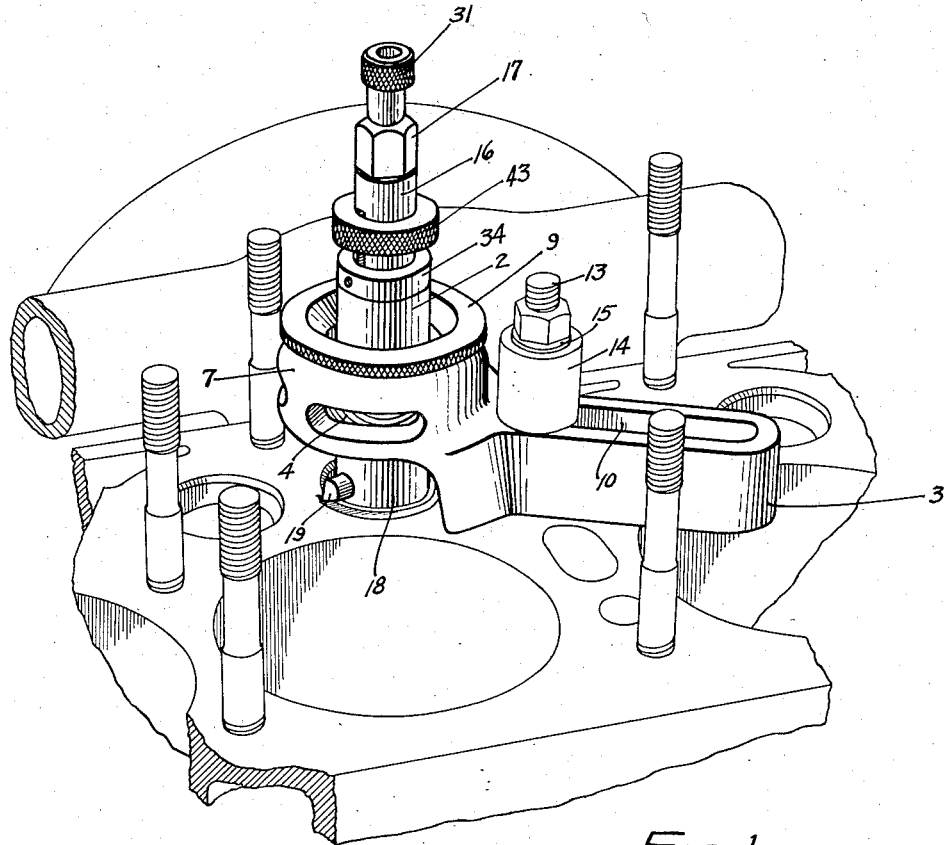
Figure 1 is a perspective view showing a portion of an engine block with the tool mounted thereon.

A spindle 16 is mounted for rotary and longitudinal movements within the supporting sleeve 2. The upper end 17 of the spindle is squared or shaped as shown in Figure 1, whereby a suitable wrench or operating tool, not shown, may be applied thereto for rotating the spindle. The spindle is provided at its lower end with an enlarged head 18 having a suitable cutting element 19 movably mounted therein. The cutting element has a notch 21, the upright parallel walls of which are inclined as shown in Figure 2. The terminal 22 of a feed rod 23 is received in the notch 21 and the opposite parallel sides or faces of this terminal coincide with the inclined walls of the notch 21, so that when the spindle is longitudinally moved with respect to the rod 23, the cutting element 19 will be longitudinally translated or moved with respect to the head 18. The angle of the parallel walls of the notch 21 and corresponding walls of the terminal 22 of the rod 23 determines the undercutting of the outer wall 53 of the recess 54, as will be noted by reference to Figure 3.

The feed rod 23 has an upper reduced portion 25 supported in a bore 26 in the upper portion of the spindle. A suitable compression spring 27 is coiled about the reduced portion 25 of the rod 23, and has one end seated against an annular shoulder 28 provided upon the feed rod, and its opposite end seated against an annular shoulder 29 provided between the bores 24 and 26. The spring 27 constantly urges the spindle 16 in an upward direction and thereby constantly holds the upper end thereof in engagement with a feed nut 31 received in threaded engagement with the upper reduced end portion 25 of the feed rod, as shown in Figure 2.

The feed rod 23 has a stud or pin 32 secured thereto which projects through an elongated aperture or slot 33 provided in the wall of the spindle 16, so that when the spindle is rotated, the feed rod 23 rotates synchronously therewith. A suitable collar 34 is engaged with the upper end of the supporting sleeve 2 and has an aperture 35 therein adapted to receive the pin 32 secured to the feed rod 23, and whereby the collar 34 is secured to the feed rod for movement therewith.

A similar collar 36 is interposed between the head 18 of the spindle and the lower face of the supporting sleeve 2, as best shown in Figure 2. This collar is shown provided with alined apertures 37 and 38 adapted to receive a pin 39, one end of which is received in threaded engagement with the aperture 38. The pin 39 passes through an aperture provided in the feed rod whereby the collar 36 is secured to the feed rod. A small thrust washer 41 is preferably interposed between the upper face of the collar 36 and the lower face of the supporting sleeve 2 to take up wear caused by the end thrust exerted on the spindle when the cutting element 19 is operating. Suitable slots or elongated openings 42 are provided in the walls of the spindle 16 to provide clearance for the pin 39, when the spindle is moved longitudinally with respect to the feed rod 23. The pins 32 and 39 and their respective collars 34 and 36 thus secure the feed rod 23 against relative longitudinal movement with respect to the supporting sleeve 2, but permits it to rotate with the spindle, when the latter is rotated.

To limit the downward travel of the cutting element 19 and to gauge the depth of the recess to be cut, a suitable stop collar 43 is adjustably secured to the upper portion of the spindle 15 by means of a set screw 44. The width of the gap 40 between the stop collar 43 and collar 34 determines the depth of the recess to be cut.

Means are provided at the lower end of the tool to facilitate axially alining the spindle with the valve seat, when securing the tool to the engine block. Such means is shown in Figure 2 and comprises a pilot 45 having a head 46 provided with a tapered face 47 adapted to be engaged with a correspondingly shaped seat 48 provided in a clamping nut 49 adapted to be received in threaded engagement with the lower threaded end portion 51 of the spindle. The beveled seat 48 cooperates with the inclined face 47 of the pilot head 46 to axially aline the pilot with the spindle. A plurality of different sized pilots are preferably furnished with the tool, corresponding to the diameters of standard sized valve stems. These pilots may readily be changed upon the tool by simply unscrewing the clamping nut 49 whereby the pilot supported in the nut may be removed and another one substituted therefor.

In the operation of this novel tool, the supporting sleeve 2, in which the spindle 16 is mounted, is loosely secured in the adjusting member 4, and the pilot 45 is then inserted into the valve stem guide, as shown in Figure 2. The bracket 3 is then secured to the upper face of the cylinder block by means of the stud 13. Because of the elongated aperture or slot 10 provided in the bracket 3, and further because of the universal mounting of the supporting sleeve 2 in the head 7 of the bracket, the spindle 16 may readily and quickly be axially alined with the valve seat, after which the parts are secured in position. Before securing the supporting sleeve 2 to the adjusting member 4, the cutting element is engaged with the engine block, as shown in Figure 2, after which the set screw 8 in the member 4 is tightened and the nut 9 secured in the head 7 to thereby firmly secure the member 4 in the head 7 of the bracket.

After the tool has been thus positioned upon the engine block, the operator or mechanic adjusts the position of the stop collar 43 upon the upper portion of the spindle so as to limit the downward travel of the cutting element 19, and therefore the depth of the recess to be cut. To adjust the stop collar, the operator may insert the valve seat insert to be used between the collar 34 and the lower face of the stop collar 43, whereby the insert may function as a gauge by which to set the stop collar. The latter is then firmly secured to the spindle by the set screw 44, after which the tool is ready for use. A suitable driving means is then applied to the upper end portion 17 of the spindle whereby the latter may be rotated to operate the cutting element 19.

When the spindle 16 is manually rotated, the operator will occasionally grasp the feed nut 31 which, when held against rotation during rotation of the spindle, will cause the latter to be relatively translated within the supporting sleeve 2 in a downward direction, because of the upper end thereof being engaged with the nut 31, it being understood that the rod 23 is held against longitudinal movement by the pins 32 and 39 and collars 34 and 36, as hereinbefore described. In the tool here shown, the cutting element 19 is shown adapted for right hand rotation and, when thus arranged, the upper reduced end portion 25 of the feed rod is provided with a left hand thread, as shown in Figure 2, so that when the spindle and rod 23 are rotated, and the operator grasps the feed nut 31 and holds it against rotation, the spindle will be gradually moved downwardly with respect to the sleeve 2 and rod 23, thereby causing the cutting element to be correspondingly fed downwardly. At the same time, the cutting element will be fed outwardly because of the element moving downwardly upon the terminal 22 of the rod. It will thus be seen that by the simple manipulation of the single feed nut 31, the downward and outward feeding of the cutting element is controlled. The cutting element may readily be removed from the spindle head 18 by rotating the fed nut 31 until the spindle is lowered sufficiently to cause the terminal 22 of the rod 23 to become disengaged from the notch 21 in the cutting element 19. The element may then be withdrawn from the spindle head 18 for sharpening or other purposes.

Figure 12:
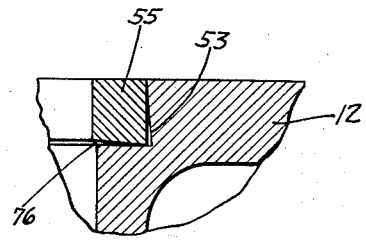
Figure 12 is an enlarged detail sectional view showing an insert positioned in a recess before the insert is expanded.
Figure 13:
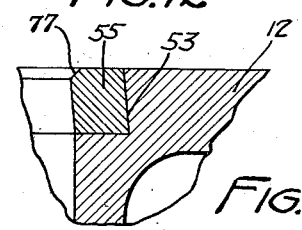
Figure 13 is a similar view showing the insert expanded into the recess.

Referring to Figures 2 and 5, it will be noted that the end face 52 of the cutting element 19 is arranged at a slight incline which corresponds substantially to the incline of the parallel walls of the terminal 22 of the rod 23. It is important that the outer upright wall 53 of the recess 54 be undercut or tapered as shown in order to provide means for securely fixing the insert 55 in the recess. The outside diameter of the insert 55 is substantially equal to or slightly less than the diameter of the upper portion of the outer wall of the recess 54 so that the insert may readily be inserted into the recess, as shown in Figure 12. When the insert is expanded in the recess, as will subsequently be described, it will completely fill the recess 54 as shown in Figure 13, whereby it cannot become loose or detached therefrom.

Figure 7 illustrates the tool positioned upon an engine block 57 having the valve seats 58 thereof disposed at an incline with respect to the upper face 59 of the engine block. The spindle may readily be alined with such an angularly disposed valve seat by means of the adjusting member 4 and the clamping nut 9 provided in the head 7 of the supporting bracket 3.

Figure 5 illustrates another form wherein the supporting sleeve 2 is secured in the head 7 of the supporting bracket 3 by means of a member 61 having a frustro-conical face 62 adapted to be seated in the tapered seat 6 in the lower portion of the head 7. The adjusting member 61 is secured in the seat 6 by the nut 9.

The form of sleeve supporting means shown in Figure 5 is used in instances where the pilot 45 cannot be used during the cutting operation, because of the upper portion of the valve stem guide being disposed too close to the upper face of the engine block to allow clearance for the nut 49 of the pilot. The adjusting member 61, it will be noted, is not adapted for universal adjustment in the head 7, as is the adjusting member 4, shown in Figures 2 and 3. Because of the angle of the outer face 62 of the member 61 coinciding with the angle of the seat 6 in the head 7, the member 61 will be axially alined with the head 7 when the clamping nut 9 is operated to secure the member 61 in the seat 6. In this construction, the spindle is axially adjusted to the valve seat by inserting the pilot 45 in the valve stem guide and relatively adjusting the supporting bracket 3 upon the engine block, until the spindle is accurately alined with the valve seat. The bracket 3 is then secured to the engine block and the nut 9 removed from the head 7, after which the supporting sleeve 2 and member 61 are removed from the head to permit the pilot to be detached from the lower end or head 18 of the spindle. The sleeve 2 and member 4 are then replaced in the head 7 of the bracket and secured therein by the nut 9, whereby the spindle will be accurately alined with the valve seat to be removed. Thus it will be seen that when the clamping member 61 shown in Figure 5 is used, the pilot is utilized only in the operation of initially setting the tool upon the engine block. A clearance slot 76 is provided in the bore of the head 7 of the bracket 3 to provide clearance for the end of the cutting element 19, when the supporting sleeve and spindle are removed from the bracket.

Figure 9:
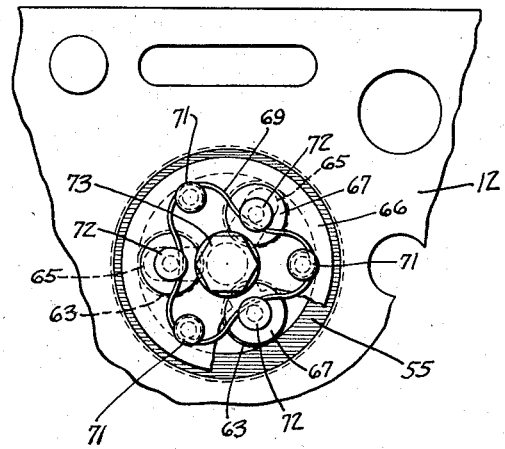
Figure 9 is a plan view of Figure 8.
Figure 10:
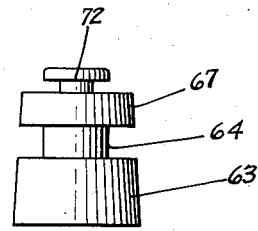
Figure 10 is an enlarged view showing one of the expanding rollers removed from its supporting means.
Figure 11:
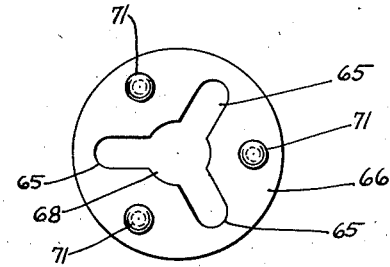
Figure 11 is a plan view of the retainer for the expanding rollers.
Figure 8:
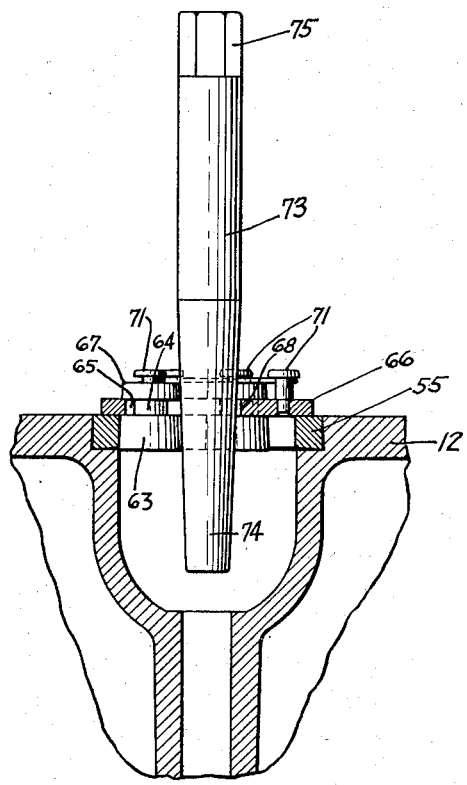
Figure 8 is a detail sectional view showing an insert mounted in a recess and the means for expanding it to secure it therein.

Figures 8 and 9 illustrate a tool for expanding the insert into the recess 54 so that the outer wall thereof will be forced into bonding engagement with the outer undercut wall 53 of the recess 54.

This tool comprises a plurality of expanding rollers 63, the peripheries of which are tapered to correspond to the taper of the outer upright wall 53 of the recess 54. The rollers 63 have reduced portions or necks 64 adapted to be received in a plurality of radially disposed slots 65 provided in a retainer plate 66. Each roller further has a head 67 adapted to engage the upper face of the plate 66 to prevent the rollers from becoming detached therefrom. The retainer plate 66 has an enlarged central opening 68 through which the heads 67 of the rollers may be inserted to mount the rollers on the retainer, as shown in Figure 9. The rollers are retained in the slots 65 by a suitable spring 69, mounted upon a plurality of rivets or studs 71 and engaged with the upper reduced end portions 72 of the rollers 63, as shown in Figure 9, whereby the rollers 63 are prevented from accidentally becoming detached from the retainer plate 66.

The means provided for outwardly moving the rollers 63 against the inner wall of the insert for the purpose of expanding the insert into the recess 54, consists of an expanding pin 73 having a lower tapered end portion 74, the taper of which corresponds to the taper of the rollers 63. The upper end portion 75 of the pin 73 is adapted to receive a suitable wrench or other instrument for rotating the pin.

To operate the expanding tool shown in Figure 8, the insert 55 is placed in the recess 54, as shown in Figure 12, after which the retaining plate 66 with the rollers 63 is placed over the insert with the peripheries of the rollers 63 engaged with the inner wall surface or bore of the insert. See Figures 8 and 9. The expanding pin 73 is then inserted through the central opening 68 in the retaining plate 66 between the rollers 63, and is rotated, whereupon the rollers will be moved outwardly in the guide slots 65 and thereby expand the insert into the tapered recess 54. The taper of the peripheries of the rollers 63 and lower end portion 74 of the pin 73 is such that only a slight downward pressure need be applied to the expanding pin 73 to expand the insert 55. The diameters of the upper heads 67 of the rollers 63 cooperate with the peripheries of the rollers to provide a comparatively long bearing for the expanding pin 73, as will readily be noted by reference to Figure 8, whereby the pin will be well guided in its downward movement during the expanding operation.

Because of the slight taper of the pin 73 and rollers 63, an extremely high pressure may be exerted against the insert to force it into the recess 54 whereby the outer and bottom walls thereof may be tightly pressed into bonding engagement with the corresponding walls of the recess, so that the insert becomes in effect, an integral part of the cylinder block. Also, because of the extreme pressure exerted against the insert, the metal thereof is partially compressed, resulting in the material thereof becoming toughened and strengthened by the operation of expanding the insert into the recess. The insert is made from a material having approximately the same coefficient of expansion as the walls of the engine block, to prevent the insert from becoming loose because of differences in the expansion and contraction of the metals. By thus tightly securing the insert in the recess, the conduction of heat from the insert is also facilitated. If desired, the lower face of the insert may be slightly beveled as indicated at 76 in Figure 12, so as to facilitate pressing the insert into the recess, as shown in Figure 13. When the insert has been secured in the recess, a valve seat 77 may be cut therein by a suitable tool, as shown in Figure 13.

In the drawings, we have shown the tool adapted for manual operation, but it is to be understood that it may readily be adapted for power operation without departing from the scope of the invention.

We claim as our invention:

1. In a tool of the class described, a supporting sleeve, a universal support therefor, a spindle mounted for rotation in said sleeve, a cutting element supported in the lower end of the spindle, means for axially moving said spindle in the sleeve to feed the cutting element downwardly into the work, said means comprising a rod having means for engaging opposite ends of the sleeve to prevent longitudinal movement of the rod, and means on said rod for moving said cutting element outwardly simultaneously as it is fed downwardly into the work.

2. In a tool of the class described, a spindle, a cutting element mounted in the spindle adjacent one end thereof and disposed at substantially right angles to the axis thereof, relatively fixed means for guidingly supporting the spindle, means whereby the spindle may be rotated, a feed rod within the spindle having an operative connection with said element, means secured to said feed rod and engaging the spindle supporting means to thereby prevent axial movement of the feed rod, and a feed nut received in threaded engagement with the feed rod and engaging the spindle, whereby rotation of said feed nut will cause axial movement of the spindle to thereby feed the cutting element into and out of engagement with the work.

3. In a tool of the class described, a spindle, a cutting element mounted in said spindle and having a notch therein provided with inclined walls, means for guidingly supporting said spindle, means whereby the spindle may be rotated, a feed rod mounted within the spindle and having an inclined terminal received in the notch in the cutting element, the opposite end of said rod protruding from said spindle and having a feed nut received in threaded engagement therewith, and means secured to the feed rod and engaging the spindle supporting means to thereby prevent longitudinal movement of said rod, whereby when said feed nut is rotated, the spindle will be longitudinally moved with respect to said rod and thereby cause the cutting element to relatively move on the inclined terminal of the feed rod whereby said element is moved outwardly simultaneously as it is moved downwardly.

4. In a tool of the class described, a spindle mounted for rotary and longitudinal movements, a tubular member for guidingly supporting said spindle, a bracket adapted to be secured to an engine block and having means for universally supporting said tubular member, a cutting element supported in the lower end of said spindle, a feed rod within the spindle having one end protruding therefrom, means restraining said rod from axial movement with respect to said tubular member, means movably mounted upon the protruding end of said rod for axially translating the spindle thereon to control the feeding travel of the cutting element, and a detachable pilot secured to the lower end of the spindle adapted to be inserted in the valve stem guide.

5. In a tool of the class described, a supporting sleeve, a universal support therefor, a spindle mounted for rotation in said sleeve, a cutting element mounted in the lower end of said spindle, and a single control means for longitudinally moving said spindle to feed the cutting element into the work, said control means comprising a rod mounted for rotation relatively to said supporting sleeve, means for restraining said rod from longitudinal movement with respect to said sleeve, said rod including an inclined face coacting with a correspondingly shaped face on the cutting element whereby the latter is moved in a radial direction with respect to the spindle, simultaneously when the spindle is moved longitudinally, and means on said rod for axially moving said spindle.

6. In a tool of the class described, a supporting sleeve, a universal support therefor, a spindle mounted for rotation in said sleeve, a cutting element mounted in the lower end of said spindle, and a single control means for longitudinally moving said spindle to feed the cutting element into the work, said control means comprising a rod supported within the spindle and having inclined faces coacting with correspondingly shaped faces on the cutting element whereby the latter is moved longitudinally, into or out of the work, when as the spindle is axially moved, and means on said rod for longitudinally moving the spindle.

7. In a tool of the class described, a supporting sleeve, a universal support therefor, a spindle mounted for rotation in said sleeve, a cutting element mounted in the lower end of the spindle, control means for the cutting element, said control means comprising a rod axially alined with the spindle and adapted for rotation therewith as a unit, and having a feeding connection with the cutting element, means for restraining said rod from axial movement with respect to said supporting sleeve, and means movably secured to said rod and engaging the spindle, whereby the spindle may be longitudinally moved to feed the cutting element into the work, and whereby the feeding connection between the rod and element will simultaneously cause the latter to be fed in a radial direction with respect to the spindle.

8. In a tool of the class described, a sleeve, a support therefor, a spindle rotatably mounted in the sleeve and supporting a cutting element, a rod mounted within the spindle and adapted for rotation therewith as a unit, a feed nut received in threaded engagement with one end of the rod and engaging the adjacent end of the spindle, and whereby the spindle may be axially moved with respect to the rod, collars secured to the rod and embracing the spindle and engaging the ends of the sleeve to prevent longitudinal movement of the rod with respect thereto, means whereby the spindle may be rotated to operate the cutting element, and said feed rod having an operative connection with the cutting element, whereby when the spindle is moved in a direction to feed the cutting element into the work, said rod will simultaneously effect an outward movement of the cutting element substantially at right angles to the feeding movement of the spindle.

9. In a tool for cutting a counterbore having an inclined wall, a support, a spindle mounted for rotation therein and having a head at one end provided with a transverse guide, a cutting element in said guide, a feed rod within the spindle adapted for rotation therewith as a unit, means connected to said rod and engaging said support to prevent axial movement of the rod with respect thereto, said rod having an inclined terminal whose opposed faces engage correspondingly shaped faces provided in the cutting element, means whereby the spindle may be rotated, and a feed nut received in threaded engagement with the rod and engaging one end of the spindle, whereby the latter may be longitudinally moved in said support to feed the cutting element into the work in an axial direction with respect to the spindle, the inclined terminal of said rod simultaneously causing the feeding element to be moved in a radial direction with respect to the spindle, whereby the outer wall of the counterbore will be inclined.

10. In a tool of the class described, a spindle mounted for rotation and having a head at one end supporting a cutting element, a support for the spindle, a feed rod mounted within said spindle and having one end operatively connected with the cutting element and its opposite end projecting from one end of the spindle, means whereby the spindle may be rotated, means mounted upon the spindle and engaging one end of said support and having a connection with said feed rod, whereby the latter is restrained from longitudinal movement with respect to said support, said feed rod being rotatable as a unit with the spindle, and a single control element for simultaneously controlling the downward and outward movements of said cutting element, when the spindle is rotated.

11. In a tool of the class described, a supporting sleeve, a universal support therefor comprising a bracket adapted to be secured to a face of an engine block, a hollow spindle mounted for rotation in said sleeve, a cutting element supported on the lower end of said spindle, a feed rod mounted in said spindle and non-rotatable with respect thereto, and means movably mounted on the feed rod and operatively engaging said spindle, and whereby the latter may be axially moved with respect to said feed rod to thereby feed the cutting element into the work.

CHARLES H. CLEVELAND.
CHARLES A. HEINE.
JOHN T. ALLISON.